(12) United States Patent
Hilmert

(10) Patent No.: US 6,531,655 B2
(45) Date of Patent: Mar. 11, 2003

(54) PROTECTIVE-DOOR HANDLE

(75) Inventor: Ralf Hilmert, Löhne (DE)

(73) Assignee: stuete Schaltgerate GmbH & Co. KG, Lohne (DE)

( * ) Notice: Subject to any disclaimer, the term of this patent is extended or adjusted under 35 U.S.C. 154(b) by 0 days.

(21) Appl. No.: 09/892,255

(22) Filed: Jun. 27, 2001

(65) Prior Publication Data

US 2003/0000819 A1 Jan. 2, 2003

(51) Int. Cl.$^7$ ................................................ E05B 65/00
(52) U.S. Cl. ................. 174/46; 70/57; 70/214; 70/271; 70/278.5; 70/432
(58) Field of Search ........................ 174/46, 68.3, 70 R, 174/135; 70/57, 214, 220, 271, 278.5, 348, 432; 200/43.13; 292/92

(56) References Cited

U.S. PATENT DOCUMENTS 5,083,122 A * 1/1992 Clark ........................ 340/5.22
6,174,016 B1 * 1/2001 Ponziani ...................... 296/56

* cited by examiner

Primary Examiner—Dean A. Reichard
Assistant Examiner—W. David Walkenhorst
(74) Attorney, Agent, or Firm—Alix, Yale & Ristas, LLP

(57) ABSTRACT

The invention relates to a protective-door handle for a protective door which is fitted with at least one safety tumbler and is intended for a protective region of a machine, mechanical installation or the like, having a central leg and two side legs which are connected thereto and can be fastened to the protective door, the central leg having a hole which opens into a wiring opening opened to the outer circumference of the central leg, there being inserted into the hole a release element which is intended for unlocking the safety tumbler and whose electric connections are connected in the wiring opening to corresponding supply lines, the wiring opening being plugged with a casting compound.

9 Claims, 2 Drawing Sheets

PROTECTIVE-DOOR HANDLE

FIELD OF THE INVENTION

The invention relates to a protective-door handle as is fitted to a protective door of fencing arrangements or protective walls for protected spatial regions surrounding machines or mechanical installations or mechanical equipment in particular having components which move and constitute a potential risk for people, for example regions around robotic production lines as used in the automobile industry.

BACKGROUND OF THE INVENTION

In the case of protective door handles of this type it is known to provide the latter with a central leg and two side legs which are connected thereto and can be fastened to the protective door.

In the case of machines, mechanical installations or equipment which are accessible via protective doors where the protective doors are fitted with safety locks it is frequently necessary to unlock and open the protective door on the spot. This is especially true when a number of protective doors are present and have to be monitored.

SUMMARY OF THE INVENTION

The object of the invention therefore is to provide a protective-door handle which can be used on the spot for unlocking and opening the protective door.

The invention therefore relates to a protective-door handle for a protective door which is fitted with at least one safety lock and is intended for a machine, mechanical installation or the like, having a central leg and two side legs which are connected thereto and can be fastened to the protective door, the central leg having a hole which opens into a wiring opening open to the outer circumference of the central leg, there being inserted into the hole a release element, in particular a release push button, which is intended for unlocking the safety lock and whose electric connections are connected in the wiring opening to corresponding feed lines, the wiring opening being plugged with a casting (potting) compound.

Further embodiments, advantages and further objects of the invention can be gathered from the following description and the subclaims.

BRIEF DESCRIPTION OF THE DRAWINGS

The invention is explained in greater detail below with reference to an exemplary embodiment illustrated in the attached figures.

DETAILED DESCRIPTION OF THE EXEMPLARY EMBODIMENT

Figure 1:
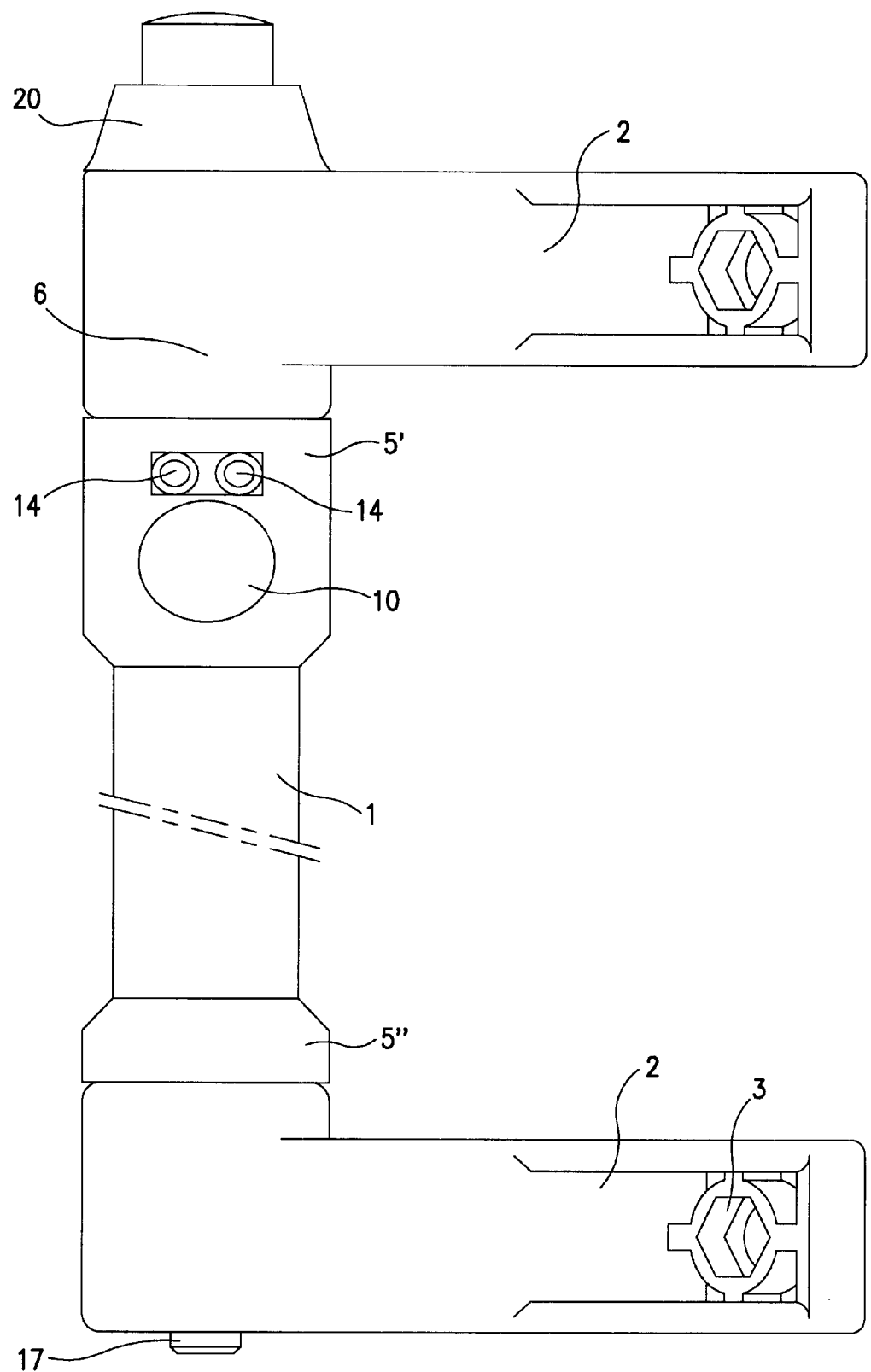
FIG. 1 shows a protective-door handle according to the invention in side view.
Figure 2:
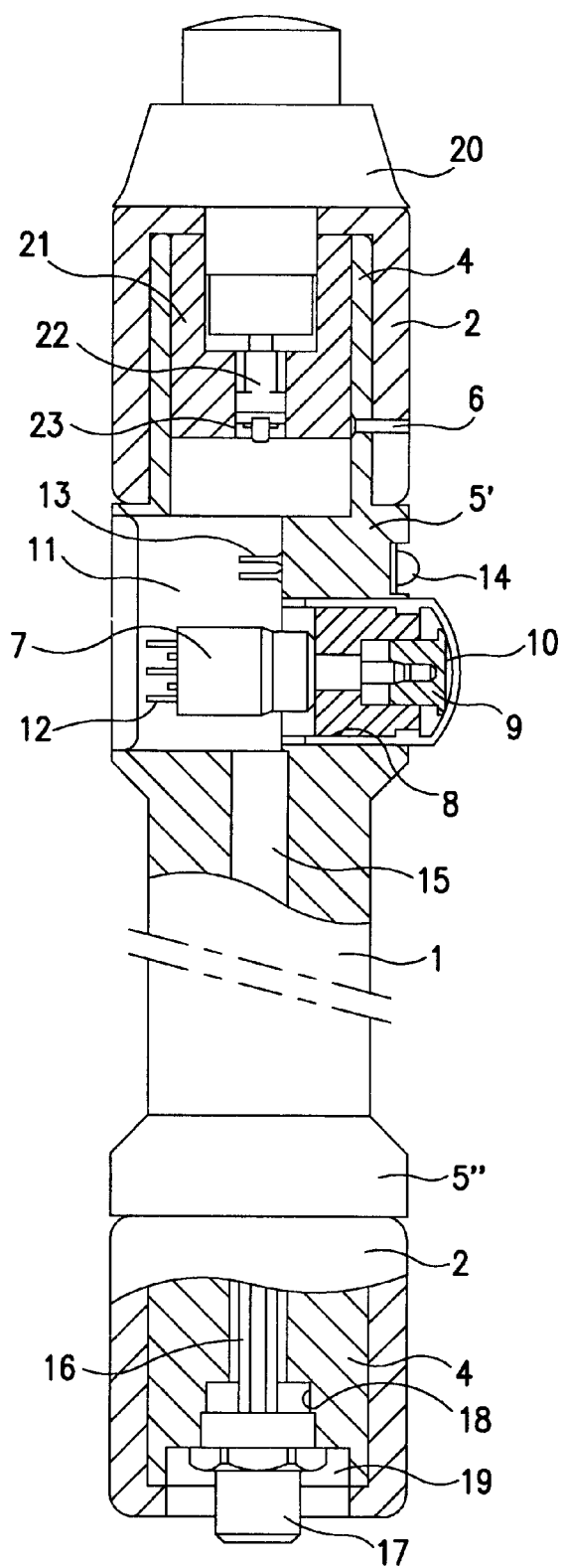
FIG. 2 shows the protective-door handle of FIG. 1 partially in section as seen from the end side.

The illustrated, essentially U-shaped protective-door handle according to the invention comprises two side legs 2 which hold a central leg 1 and can be fastened on a protective door via screws which are plugged through corresponding sockets 3 and held in the latter by their heads.

The central leg 1 has an interference-fit plug or peg 4 at each axial end of the central leg for plugging into a corresponding, lateral, sleeve-shaped recess of the respective side leg 2 and, adjacent to the peg 4, a respective stop section 5' and 5" for resting against the corresponding side leg 2.

The central leg 1, whose peg 4 adjacent to the stop section 5' is pinned, and therefore also rotationally secured, to the adjacent side leg 2 via a pin 6, is provided in the region of the stop section 5' with a release push button 7 for unlocking the safety lock of the protective door to which the protective-door handle is fitted, the release push button 7 being screwed into a threaded hole 8 running perpendicular with respect to the longitudinal axis of the central leg 1, and the actuating element 9 of said release push button being manually actuable via a flexible or rigid top 10 which is fitted on it. The threaded hole 8 opens into a wiring opening 11 which is open toward the outer circumference of the central leg 1 and in which the electric connections 12 of the release pushbutton 7 are situated and also into which the electric connections 13 of two operating-state display diodes 14 (for example, green LED for locked protective door, red LED for unlocked protective door) run. The release pushbutton 7 and the operating-state display diodes 14 are connected to corresponding, electric supply lines (not illustrated), which lead to a corresponding controlling means for the safety locks of the protective doors and for the means for enabling the protected machine, installation or the like to be switched on, via corresponding cables which are soldered to the electric connections 12, 13 within the wiring opening 11, and the wiring opening 11 is filled with a potting compound which encloses, in an electrically insulating manner, the electric contacts which are situated therein and are connected to one another.

It may also be expedient to conduct the electric supply line through one of the side legs 2—instead of leading it directly out of the wiring opening 11. The central leg 1 is then provided with an axial hole 15 which extends from one end as far as the wiring opening 11 and which holds a cable 16 which is connected, ie is soldered, in the wiring opening 11 to the electric connections 12, 13 and is connected at the other end to a plug 17 which is screwed into a hole extension 18 provided with thread. The plug 17 is essentially held here by a depression 19 on the end side of the central leg 1 and of the adjacent side leg 2.

The plug-in peg 4 adjacent to the stop section 5' is, when an emergency-stop switch 20 is additionally also to be provided for the protected machine, mechanical installation or the like, designed as a hollow peg whose cavity is connected to the wiring opening 11. A socket 21 which is likewise pinned to the side leg 2 and is intended for the emergency-stop switch 20 is then inserted into the hollow plug-in peg 4, from the side of the side leg 2, the contact block 22 together with its electric connections 23 being accessible from the wiring opening 11 and the cavity in the plug-in peg 4, and being connectable to corresponding electric lines.

In addition to the release pushbutton 7 one or more other pushbuttons for additional functions may also be provided, said pushbuttons likewise being wired via the wiring opening 11.

The release pushbutton 7 may also be arranged at the point where the emergency-stop switch 20 is situated in the exemplary embodiment illustrated. In this position, the release pushbutton 7 can then be held by the hole of the hollow plug-in peg 4 and wired via the wiring opening 11.

It is obvious to the expert that the exemplary embodiment which is illustrated and described is not intended to restrict the invention thereto, but that many changes and modifications are possible without departing from the spirit of the invention as defined in the claims.

What is claimed is:

1. A protective-door handle for a protective door which is fitted with at least one safety lock and is intended for a protective region of a machine, mechanical installation or the like, having a central leg and two side legs which are connected thereto and can be fastened to the protective door, the central leg having a hole which opens into a wiring opening open to the outer circumference of the central leg, there being inserted into the hole a release element which is intended for unlocking the safety lock and whose electric connections are connected in the wiring opening to corresponding supply lines, the wiring opening being plugged with a potting compound.

2. The protective-door handle as claimed in claim 1, in which at least one operating-state display diode is provided whose electric connections run into the wiring opening.

3. The protective-door handle as claimed in claim 1, in which an emergency-stop switch is provided whose electric connections are accessible from the wiring opening.

4. The protective-door handle as claimed in claim 3, in which the emergency-stop switch is arranged at one end of the central leg.

5. The protective-door handle as claimed in claim 1, in which a supply cable is guided into the wiring opening from the outside.

6. The protective-door handle as claimed in claim 1, in which a hole is provided which extends from the wiring opening as far as one end of the central leg and in which a cable connected to the electric supply lines is arranged, said cable being connected at the end of the central leg to a plug or being led out as a supply cable.

7. The protective-door handle as claimed in claim 1, in which the hole runs transversely with respect to the longitudinal axis of the central leg.

8. The protective-door handle as claimed in claim 1, in which the at least one operating-state display diode is arranged adjacent to the release element.

9. The protective-door handle as claimed in claim 1, in which the release element is a release push-button.

* * * * *

UNITED STATES PATENT AND TRADEMARK OFFICE
CERTIFICATE OF CORRECTION

PATENT NO.    : 6,531,655 B2
DATED         : March 11, 2003
INVENTOR(S)   : Hilmert It is certified that error appears in the above-identified patent and that said Letters Patent is hereby corrected as shown below:

<u>Title page,</u>
Item [73], Assignee, delete "stuete Schaltgerate"
and replace with -- steute Schaltgerate --.

Signed and Sealed this

Twenty-second Day of June, 2004

JON W. DUDAS
*Acting Director of the United States Patent and Trademark Office*